(12) United States Patent
Keenan

(10) Patent No.: US 10,892,062 B2
(45) Date of Patent: Jan. 12, 2021

(54) SYSTEMS AND METHOD FOR REDUCING TRITIUM MIGRATION

(71) Applicant: Jeffrie Keenan, Penn Valley, PA (US)

(72) Inventor: Jeffrie Keenan, Penn Valley, PA (US)

( * ) Notice: Subject to any disclaimer, the term of this patent is extended or adjusted under 35 U.S.C. 154(b) by 809 days.

(21) Appl. No.: 14/936,940

(22) Filed: Nov. 10, 2015

(65) Prior Publication Data

US 2016/0118146 A1   Apr. 28, 2016

Related U.S. Application Data

(63) Continuation of application No. 13/093,811, filed on Apr. 25, 2011, now Pat. No. 9,183,954.

(60) Provisional application No. 61/327,394, filed on Apr. 23, 2010.

(51) Int. Cl.
| | |
|---|---|
| *G21C 19/07* | (2006.01) |
| *G21F 1/12* | (2006.01) |
| *G21C 11/02* | (2006.01) |
| *G21F 3/00* | (2006.01) |

(52) U.S. Cl.
CPC .............. *G21C 19/07* (2013.01); *G21C 11/02* (2013.01); *G21F 1/12* (2013.01); *G21F 3/00* (2013.01); *Y02E 30/30* (2013.01)

(58) Field of Classification Search
CPC ........... G21F 1/12; G21F 1/125; G21C 19/07; G21C 19/32; B32B 3/04; B23B 2250/40; B23B 17/10403; A61B 6/107
USPC .......................................... 588/259; 277/647
See application file for complete search history.

(56) References Cited

U.S. PATENT DOCUMENTS

| | | | | |
|---|---|---|---|---|
| 1,368,094 | A | * | 2/1921 | Angebaud ................. G21F 1/12 116/169 |
| 2,737,597 | A | * | 3/1956 | Strobino ................. G21F 1/125 109/1 S |
| 3,231,451 | A | * | 1/1966 | Gazelle .................... G21F 1/125 174/377 |
| 3,337,418 | A | | 8/1967 | Halacy |
| 3,622,432 | A | * | 11/1971 | McCluer .................... G21F 1/02 156/286 |
| 3,865,688 | A | * | 2/1975 | Kleimola ................. G21C 9/00 376/246 |
| 3,895,143 | A | * | 7/1975 | Tarlow ..................... C09J 7/026 162/153 |
| 3,984,282 | A | | 10/1976 | Kleimola |
| 3,988,972 | A | | 11/1976 | Goto et al. |
| 4,072,189 | A | | 2/1978 | Chaix et al. |
| 4,135,257 | A | | 1/1979 | Lof |
| 4,375,104 | A | | 2/1983 | Starr et al. |
| 4,556,757 | A | * | 12/1985 | Oberbach ............ H05K 9/0088 174/376 |
| 4,670,658 | A | * | 6/1987 | Meyers ..................... G21F 1/12 250/515.1 |
| 4,803,042 | A | | 2/1989 | Gilmore et al. |
| 5,519,901 | A | | 5/1996 | Friedman |
| 5,761,262 | A | | 6/1998 | No et al. |

(Continued)

*Primary Examiner* — Sharon M Davis
(74) *Attorney, Agent, or Firm* — The Belles Group, P.C.

(57) ABSTRACT

A system and method for reducing tritium migration. In one aspect, the invention is a method of reducing tritium mitigation from a spent nuclear fuel pool containing a body of tritiated water having an exposed surface, the method comprising hermetically sealing the exposed surface of the body of tritiated water with a cover movable between an open-state and a close-state.

5 Claims, 7 Drawing Sheets

(56) References Cited

U.S. PATENT DOCUMENTS

| | | | |
|---|---|---|---|
| 6,561,522 B1 * | 5/2003 | Radelet | F16J 15/021 277/314 |
| 7,897,949 B2 * | 3/2011 | Ballsieper | G21F 1/12 250/505.1 |
| 2005/0103339 A1 | 5/2005 | Daly et al. | |
| 2008/0182093 A1 * | 7/2008 | Sonntag | G21F 1/12 428/220 |
| 2010/0284506 A1 | 11/2010 | Singh | |

* cited by examiner

SYSTEMS AND METHOD FOR REDUCING TRITIUM MIGRATION

CROSS-REFERENCE TO RELATED PATENT APPLICATIONS

This application is a continuation of U.S. patent application Ser. No. 13/093,811 filed on Apr. 25, 2011, which claims the benefit of U.S. Provisional Application No. 61/327,394 filed on Apr. 23, 2010. The disclosures of the above applications are incorporated herein by reference in their entireties.

FIELD OF THE INVENTION

The present invention relates generally to the field of reducing environmental contamination in nuclear power plants, and specifically to reducing the migration of tritium from spent nuclear fuel pools.

BACKGROUND OF THE INVENTION

In the operation of water cooled nuclear reactors, tritium is a direct product of nuclear fission. Tritium has a very short biological half life in the human body of 7 to 14 days which reduces the total effects of single-incident ingestion and precludes long term bioaccumulation of tritium from the environment. As tritium is not a strong beta emitter, it is not dangerous externally or simply through contacting a person's skin. However, tritium can be a radiation hazard when it is inhaled, ingested via food stuff, ingested in water, or absorbed through the skin.

In the nuclear industry, tritium is a direct product of the operation of nuclear power plants. When a nuclear fuel rod becomes spent through use in the nuclear reactor, it is stored for up to five years or longer in what is known as a spent fuel pool in order to cool the spent fuel rod and rid the spent fuel rod of its radioactive components.

Tritium control and recovery needs to be considered in the nuclear plant fuel cycle since production is not a goal of the reactor. Tritium does represent a personnel and environmental radiological hazard in sufficient concentrations. Because tritium concentration in the nuclear storage pools can be relevantly high, a very small amount of tritiated water can affect a large amount of ground water. Further, tritiated water has the same chemical characteristics as regular water, which means that the tritiated water can spread through evaporative loss and redeposit via subcooling condensation on the external surfaces within the spent fuel pool room.

Therefore, it is an object of this invention to reduce the mitigation of tritiated water from the spent nuclear fuel pool.

SUMMARY OF THE INVENTION

The present invention is directed to systems and methods for reducing the migration of tritium from spent nuclear fuel pools to the internal atmosphere of and surfaces within a containment structure housing a spent nuclear fuel pool. In accordance with certain aspects of the present invention, this reduction in tritium migration can be accomplished via: (1) containing tritiated water vapor that evaporates from the exposed surface of the body of tritiated water within the spent nuclear fuel pool within a volume of a controlled atmosphere; (2) inducing condensation of the tritiated water vapor onto control surfaces within the internal atmosphere of the containment structure that houses spent nuclear fuel pool; (3) controlling the thermodynamic properties of the internal atmosphere of the containment structure that houses the spent nuclear fuel pool to minimize evaporation from the exposed surface of the body of tritiated water; and/or (4) preventing escape of tritiated water vapor from the internal atmosphere of the containment structure that houses the spent nuclear fuel pool.

In one embodiment, the invention can be a system for reducing tritium migration comprising: a spent nuclear fuel pool comprising a body of tritiated water having an exposed surface; and a cover movable between an open state in which the cover does not obstruct access to the exposed surface of the body of tritiated water and a closed state in which the cover hermetically seals the exposed surface of the body of tritiated water.

In another embodiment, the invention can be a system for reducing tritium migration comprising: a spent nuclear fuel pool comprising a body of tritiated water having an exposed surface; and a tent structure comprising a frame and a vapor impermeable membrane, the tent structure movable between an open state in which the tent structure does not obstruct access to the exposed surface of the body of tritiated water and a closed state in which the tent structure hermetically seals the exposed surface of the body of tritiated water.

In yet another embodiment, the invention can be a method of reducing tritium mitigation from a spent nuclear fuel pool containing a body of tritiated water having an exposed surface, the method comprising hermetically sealing the exposed surface of the body of tritiated water with a cover movable between an open-state and a close-state.

In still another embodiment, the invention can be a method of reducing tritium mitigation from a spent nuclear fuel pool containing a body of tritiated water having an exposed surface, the method comprising: monitoring a temperature of an internal environment of a containment structure housing the spent nuclear fuel pool; monitoring a temperature of the body of tritiated water of spent nuclear fuel pool; and controlling the temperature of the internal environment of the containment structure so as to be substantially equal to the temperature of the body of tritiated water of the spent nuclear fuel pool. The temperature of the body of tritiated water can be an average temperature or a temperature taken at a location adjacent the exposed surface of the body of tritiated water. A proper control system, including temperature sensors and processore, can be utilized to repetitively measure and compare the temperatures of both the internal atmosphere of the containment structure and the body of tritiated water, and to adjust the temperature of the internal atmosphere of the containment structure when a threshold temperature differential is identified via the comparison.

In a further embodiment, the invention can be a method of reducing tritium mitigation from a spent nuclear fuel pool containing a body of tritiated water having an exposed surface, the method comprising: positioning at least one dehumidifier within an internal environment of a containment structure housing the spent nuclear fuel pool; condensing tritiated water vapor from the internal environment using the dehumidifier; and flowing the condensed tritiated water vapor in liquid form back into the spent nuclear fuel pool or into a waste management sub-system.

In a yet further embodiment, the invention can be a system or method of reducing tritium mitigation from a spent nuclear fuel pool that utilizes humidity traps having exposed surfaces that are configured to induce condensation of tritiated water vapor in an internal environment of a containment structure housing the spent nuclear fuel pool. In one such embodiment, the humidity traps can comprise sacrificial collection plates comprising metal fins, tubes or plates embedded in a desiccate adsorption material. Other surfaces within the room can be coated with a material that is less conducive to causing condensation thereon as compared to the exposed outer surfaces of the humidity traps. Once such coating is a polymer coating.

In an even further embodiment, the invention can be a system or method of reducing tritium mitigation from a spent nuclear fuel pool by humid air from entering and/or escaping the internal environment of a containment structure housing the spent nuclear fuel pool. In one such embodiment, entrance points to the internal environment will comprise air locked chambers which are heated to drive moisture out, thereby further reducing moisture enriched air from entering or leaving the internal environment. The air-lock chamber can be operated such that only one egress is open at a time and sufficient time between egress openings is permitted to lapse that allows the heating system to suppress moisture within the chamber.

In another embodiment, the invention can be a method of reducing tritium mitigation from a spent nuclear fuel pool by coating and sealing surfaces within an internal environment of a containment structure housing the spent nuclear fuel pool that are not intended to have evaporative tritiated water condense thereon. Sealing of floor gaps and other seams will inhibit any tritiated water from migrating and/or leaking into those gaps and seams before detection and clean-up.

DETAILED DESCRIPTION OF THE INVENTION

Figure 1:
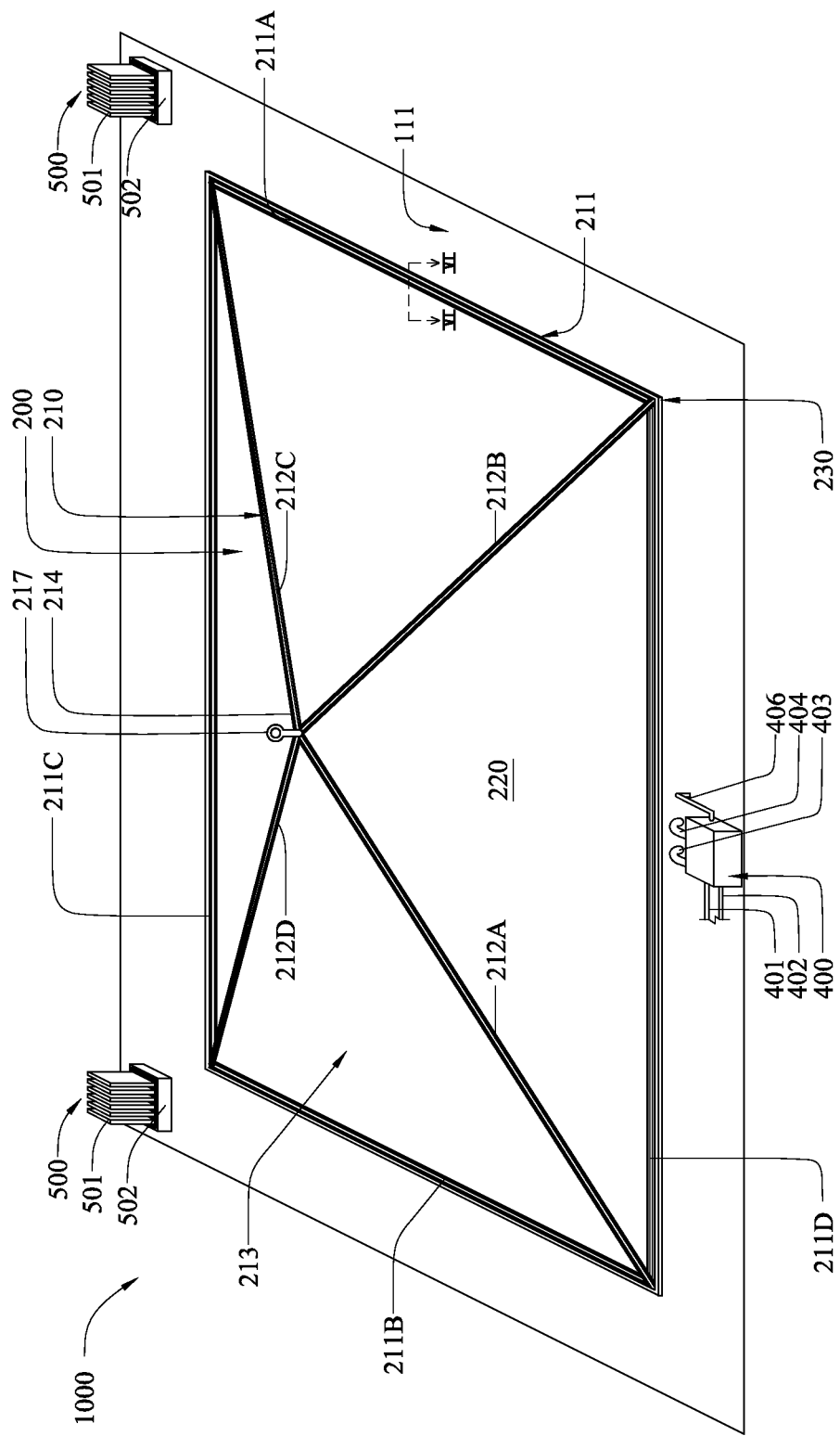
FIG. 1 is a perspective view of a system for reducing tritium migration in accordance with one embodiment of the present invention.

It has been discovered by the present inventor that one of the primary mechanisms by which tritium is transferred from the interior coolant system to the internal atmosphere of the containment structure and, hence, to the external atmosphere, may be through evaporative losses of the body of tritiated water of the spent nuclear fuel pool. Evaporative loss within the spent nuclear fuel pool increases with a greater difference between the pool saturation vapor pressure and the vapor pressure of the internal chamber of the containment structure at room temperature. The water of the spent nuclear fuel pool is heated by the decay heat generated by the spent nuclear fuel. While variable, the heating load in the spent nuclear fuel pool is substantial and further drives evaporative loss.

When the body of tritiated water of the spent nuclear fuel pool evaporates, it takes the tritium with it, thereby carrying tritium (in the form of tritiated water vapor) into the atmosphere. Once the tritiated water vapor reforms in liquid form as condensate, the condensed tritiated water vapor can mitigate to the outside environments via a variety of transport mechanisms.

One aspect of the present invention is to monitor and control the temperatures in the pool and the room surrounding the pool so as to keep them as close to the same as possible. By maintaining the pool temperature close to the room temperature, the opportunity for evaporation of the water in the spent fuel pool is decreased. Therefore, the opportunity for tritiated water to migrate to the internal environment of the building or to the external environment outside of the building is also decreased.

In another embodiment, to reduce humid air from entering (or exiting) the internal atmosphere of the containment structure housing the spent nuclear fuel pool, aggress points to the internal atmosphere of the containment structure will have air-locked type chambers which are heated to drive moisture out, thereby further reducing the introduction and/or escape of moisture enriched air into and/or out of the internal atmosphere of the containment structure. The air-lock chamber should be operated such that only one door is open at a time and sufficient time between door openings is permitted to lapse that allows the heating system to suppress moisture within the enclosure.

Additionally, surfaces within the internal atmosphere of the containment structure should be re-evaluated for coating on surfaces and sealing for floor areas. In other words, all surfaces that are not intended to have evaporative tritiated water condense thereon should be coated. The coating will assist in prevention of tritiated water surface sub-cooling on those surfaces and increase the benefit of the collection plates which remain uncoated. Sealing of floor gaps and other seams will inhibit any tritiated water from migrating and/or leaking into those gaps and seams before detection and clean-up.

In a typical nuclear power plant, the spent nuclear fuel pools are not covered, but rather remain open and exposed to the internal atmosphere of the containment structure (which is typically a building) within which the spent nuclear fuel pool is housed. In addition to the aforementioned safeguards, the system of the present invention provides one or more covers (in the exemplified embodiment, there are two covers) that reduce the migration of tritium by sealing the exposed surface of the spent nuclear fuel pool.

Figure 2:
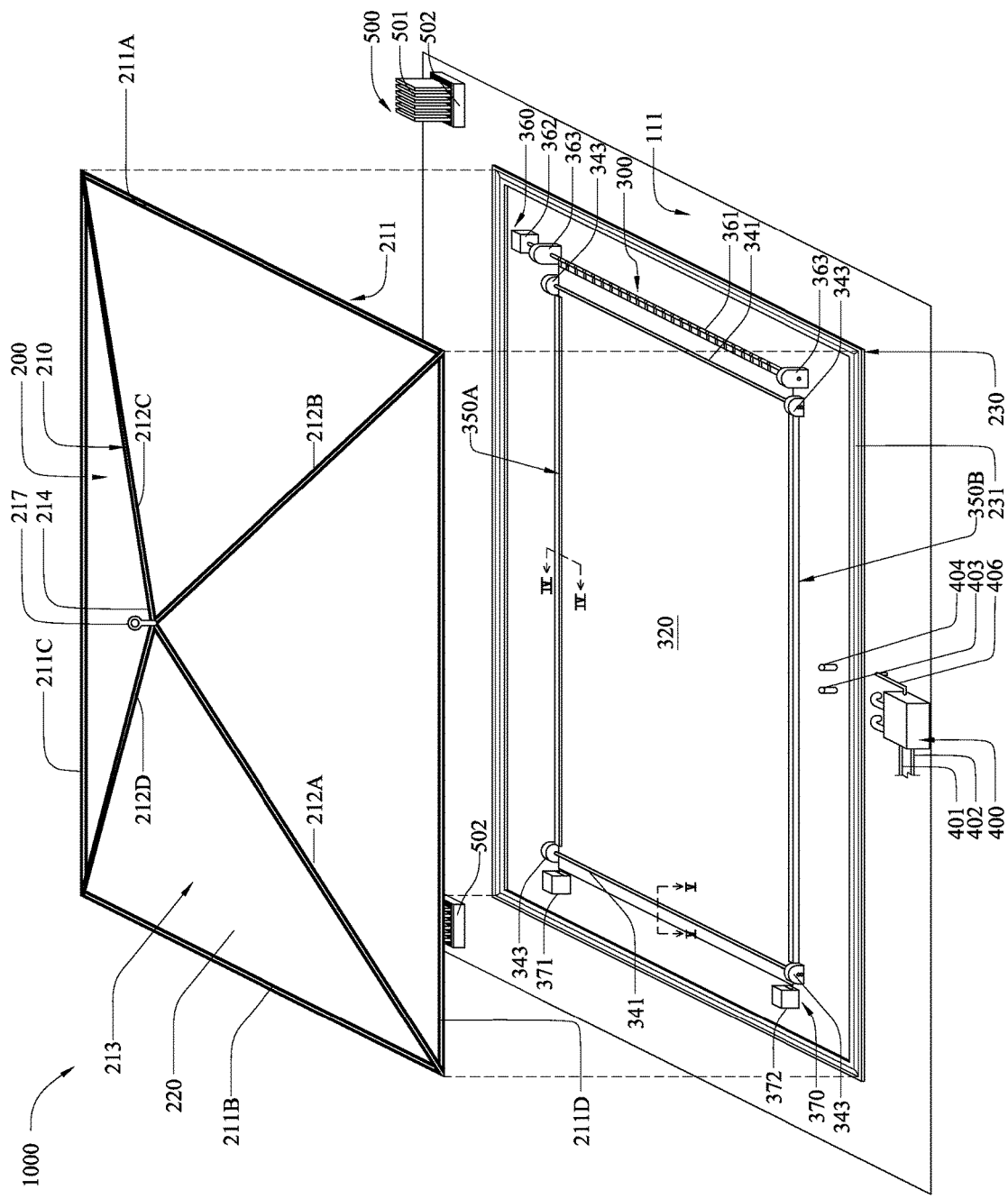
FIG. 2 is a perspective view of the system for reducing tritium migration of FIG. 1 wherein the tent structure has been removed to expose the tarp assembly, which is in the closed-state.
Figure 7:
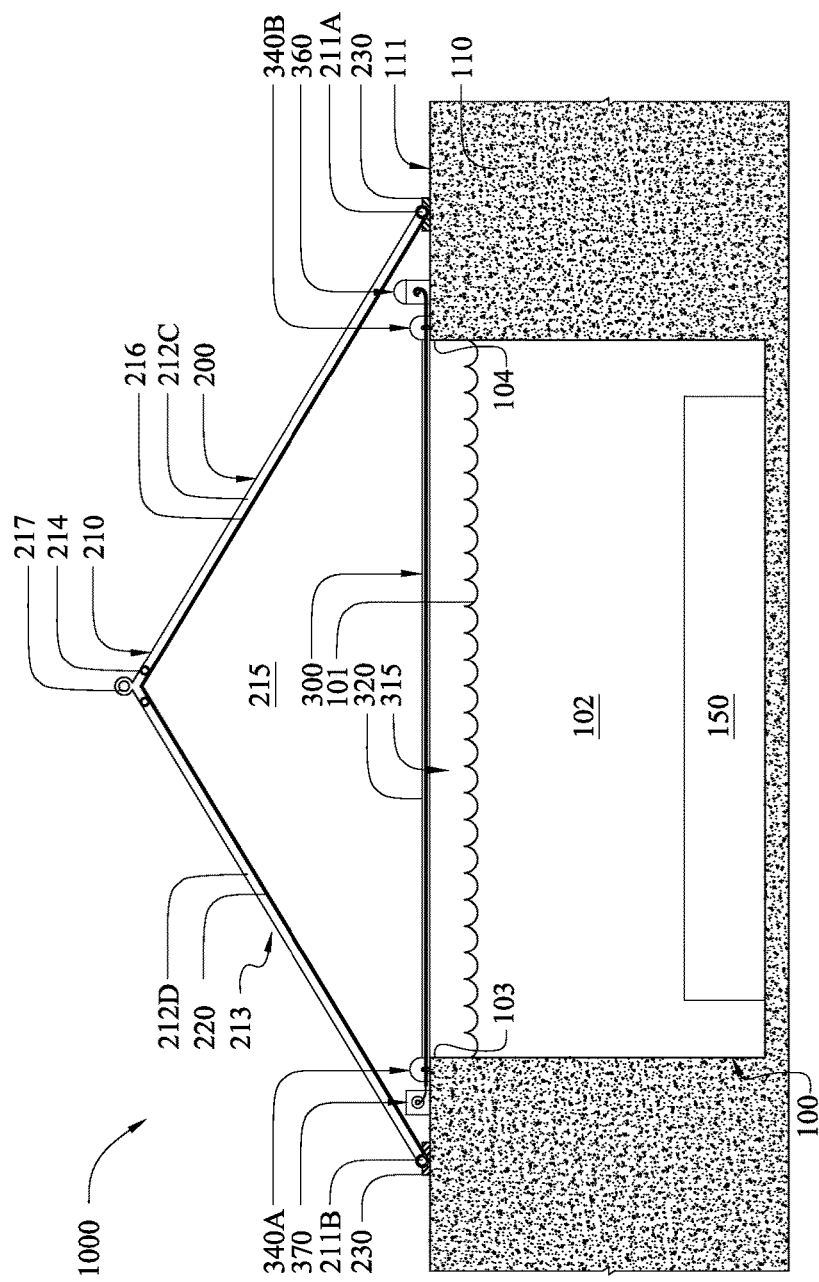
FIG. 7 is a side-view schematic of the system of FIG. 1, wherein both the tent structure and the tarp assembly are in a closed-state.

Referring first to FIGS. 1, 2 and 7 concurrently, a system 1000 for reducing tritium migration is disclosed (hereinafter the "TMR system"). The TMR system 1000 generally comprises a spent nuclear fuel pool 100, a tent structure 200, a tarp assembly 300, a condenser 400, and a plurality of humidity traps 500. Of course, in alternate embodiments of the present invention, one or more of the aforementioned components can be omitted. For example, in certain embodiment, only one of the tenet structure 200 or the tarp assembly 300 can be utilized in the TMR system 1000. Moreover, the condenser 400 and the humidity traps 500 can be omitted as desired.

Both the tent structure 200 and the tarp assembly 300 act as covers for hermetically sealing the exposes surface 101 of the body of tritiated water 102. As discussed in greater detail below, each of the tent structure 200 and the tarp assembly 300 are movable between an open state in which access to the exposed surface 101 of the body of tritiated water 102 is unobstructed and a closed state in which the exposed surface 101 of the body of tritiated water 102 is hermetically sealed. While the exemplified embodiment of the TMR system 100 comprises both the tent structure 200 and the tarp assembly 300, one of these covers can be omitted as desired in alternate embodiments of the invention. Moreover, while both the tent structure 200 and the tarp assembly 300 hermetically seal the exposes surface 101 of the body of tritiated water 102 in the exemplified embodiment of the present invention, it is possible that one of these covers will not form a seal that is hermetic in nature in alternate embodiments.

While not illustrated, the entire spent nuclear fuel pool 100 is housed within an internal atmosphere of containment structure (not illustrated). The spent nuclear fuel pool 100 is formed in a radiation shielding body 110, which in the exemplified embodiment is a concrete monolith. The top surface 111 of the radiation shielding body 110 forms the floor surface of the containment structure. As is known in the art, spent nuclear fuel 150 is loaded within the spent nuclear fuel pool 100 for a period of time after removal from the reactor vessel for cooling. The spent nuclear fuel 150 is supported at the bottom of the spent nuclear fuel pool in racks or other structures.

Figure 3:
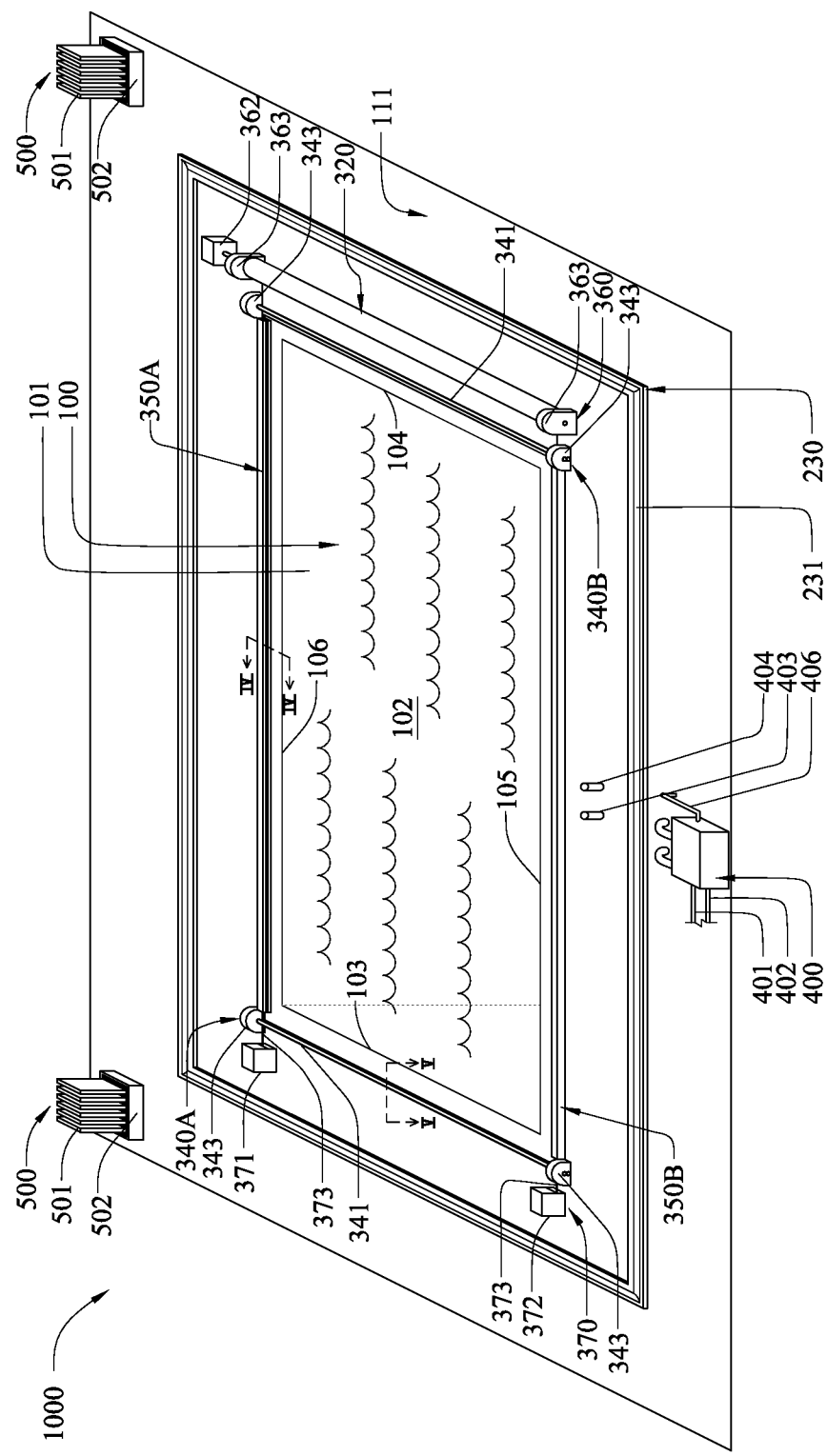
FIG. 3 is a perspective of the system for reducing tritium migration of FIG. 2, wherein the tarp assembly is in the open-state.

The tent structure 200 is illustrated in the closed state in FIG. 1 and in the open state in FIG. 2 (also in FIG. 3). When in the open state, the tent structure 200 is removed from its position over the spent nuclear fuel pool 100 and placed in a position such that the tent structure does not obstruct access to the spent nuclear fuel pool 100. For example, in the open state, the tent structure 200 may be positioned on the floor surface 211 of the containment structure away form the spent nuclear fuel 100 or on some other supporting structure.

The tent structure 200 generally comprises a frame 210 and a vapor impermeable membrane 220. The frame 210 comprises a base 211 (formed of four beams 211A-D) and a plurality of uprights 212A-D that are connected to and extend upward from the base 211, thereby forming a dome-like structure 213 in the shape of a four-sided pyramid. Of course, the frame 210 can take on a wide variety of structural shapes, sizes and geometries, none of which are limiting of the present invention unless specifically claimed. Similarly, while the base 211 forms a rectangular shape, the invention is not so limited and the base 211 can take on other shapes, such as circular, oval, triangular, or other polygonal shapes. The exact size and shape of the base 211 will be dictated by the size and shape of the spent nuclear fuel pool 110.

The frame 210 is formed by a plurality of interconnected structural beams 211A-D, 212A-D. While the structural beams 211A-D, 212A-D are hollow tubes in the exemplified embodiment, the structural beams 211A-D, 212A-D can take on a wide variety of embodiments, including without limitation I-beams, T-beams, angle-beams, solid rods, and combinations thereof. The interconnectivity between the structural beams 211A-D, 212A-D can be achieved by welding, clamping, fasteners, integral formation or combinations thereof as is known in the art. The frame 210 (including its structural beams 211A-D, 212A-D) is designed to be suitably rigid and robust so as to be capable of maintaining its three-dimensional geometry when the vapor impermeable membrane 220 is coupled thereto. The structural beams 211A-D, 212A-D may be formed of a metal, plastic, or composite material in certain embodiments.

The frame 210 of the tent structure 200 further comprises an eyelet 217 located at an apex 214 of the dome-like structure 213 to facilitate lifting and handling of the tent structure 200 by a crane or other lifting device within the containment structure/building. The eyelet 217 provides a structure by which the tent structure 200 can be grasped for repetitive movement between the closed state (FIG. 1) and the open state (FIG. 2) of the tent structure 200.

The vapor impermeable membrane 220 is coupled to the frame 210 so that an inner surface 216 of the vapor impermeable membrane 220 forms a cavity 215 having an open bottom end defined by the base 211 of the frame 210. With the exception of the open bottom end, the vapor impermeable membrane 220 forms a hermetically sealed structure. Thus, if any seams exist, they are preferably fluid tight. However, it is preferable that the vapor impermeable membrane 220 be made as a single, unitary piece of material with seamless construction in certain embodiments.

The vapor impermeable membrane 220 is preferably a thin flexible sheet of material that is impervious to water vapor. Of course, in alternate embodiments, the vapor impermeable membrane 220 could be rigid. However, flexibility may be preferred in embodiments where the frame 210 may be collapsible.

Figure 6:
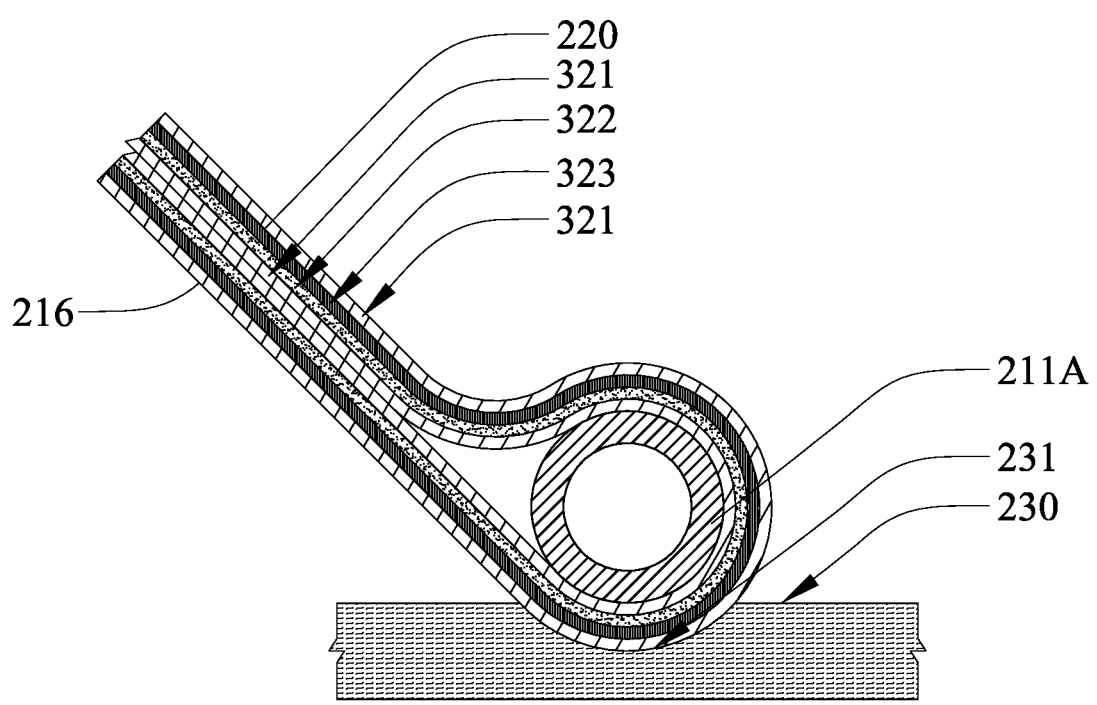
FIG. 6 is a cross-sectional view of the base of the tent structure resting atop a closed-perimeter gasket take along view VI-VI of FIG. 1.

The vapor impermeable membrane 220 can be a single-layer construct or a multi-layer laminate. If the vapor impermeable membrane 220 is a single-layer construct, the single layer is made of a rubber, polymer, metal or other material that is impervious to water vapor. In one embodiment wherein the vapor impermeable membrane 220 is a multi-layered laminate, the vapor impermeable membrane 220 can comprise at least one vapor impermeable layer 221, at least one radiation shielding layer 222, and at least one thermal insulating layer 223 (see FIG. 6). The vapor impermeable layer 221, in one embodiment, can be constructed of a rubber, a thermoplastic elastomer, a polymer, a metal or other material that is impervious to water vapor. The radiation shielding layer 222 can be constructed of materials that are known in the art to absorb/shield neutron radiation and/or gamma radiation. The thermal insulating layer 223 can be formed of, without limitation, blankets of alumina-silica fire clay (Kaowool Blanket), oxides of alumina and silica (Kaowool S Blanket), alumina-silica-zirconia fiber (Cerablanket), and alumina-silica-chromia (Cerachrome Blanket). onstructed out of material such as a Kaewool blanket. In the specific embodiment exemplified, the upper-most and lower-most layers of the vapor impermeable membrane 220 are vapor impermeable layers 221 wherein the radiation shielding layer 222 and the thermal insulating layer 223 are sandwiched therebetween.

Referring now to FIGS. 1-2 and 6-7 concurrently, when the tent structure 200 is positioned in the closed state, the base 211 of the tent structure 200 forms a hermetically seal that forms a perimeter that surrounds the spent nuclear fuel pool 100, thereby hermetically sealing the cavity 215 from the remainder of the internal atmosphere of the containment structure/building. This hermetic seal can be formed in a wide variety of ways. In the exemplified embodiment, a gasket 230 is provided on the floor surface 211 that forms a closed perimeter about the spent nuclear fuel pool 100. The gasket 230 is sized and shaped to correspond to the size and shape of the base 210 of the tent structure 200. Thus, when the tent structure 200 is in the closed state, the base 210 of the tent structure 200 rests atop and is in surface contact with the gasket 230, thereby forming a hermetically sealed interface that forms a closed-perimeter about the spent nuclear fuel pool 100.

A groove 231 is provided in the top surface of the gasket 230. The groove 231 provides a depression in which the base 211 of the tent structure 200 can nest, thereby improving the quality of hermetic seal and providing a means by which proper positioning of the tent structure 200 can be ensured. While not illustrated, one or more clamps can be provided that would clamp the base 210 of the tent structure 200 to the floor surface 211, thereby further compressing the gasket 230 and ensuring a hermetic seal. In one embodiment, at least one clamp is provided on each side of the tent structure 200.

In alternate embodiments, the hermetic seal between the base 211 of the tent structure 200 can be accomplished by mere surface contact between the base 211 and the floor surface 211 without the use of a gasket or other sealing structure. In still other embodiments, a compressible gasket (similar to gasket 230) could be connected directly to the base 211 rather than to the floor surface 211. As with the base 211 of the tent structure 200, the gasket 230 can take on a wide variety of shapes but is preferably selected to correspond in size and shape to the base 211.

As mentioned above, when the tent structure 200 is in the closed state, the cavity 215 becomes hermetically sealed. As a result, tritiated water vapor coming from the exposed surface 101 of the body of tritiated water 101 is contained within the cavity 215 (even if the tarp assembly 300 is omitted as in FIG. 8). The tritiated water vapor within the cavity 215 may condense on the inner surface 216 of the vapor impermeable membrane 220 where it is either re-directed back into the spent nuclear fuel pool 100 or to waste collection sub-system. The condensed tritiated water vapor can be captured and directed by an internal funnel 240 (discussed in detail below with respect to FIG. 8).

Furthermore, because tritiated water vapor may build-up within the hermetically sealed cavity 215 that is formed between the vapor impermeable membrane 220 of the tent structure 200 and the exposed surface 101 of the body of tritiated water 102 over time, a condenser 400 can be operably coupled to the hermetically sealed cavity 215 to dehumidify the air within the hermetically sealed cavity 215 prior to moving the tent structure 200 into the open state and/or periodically as desired. The condenser 400 is a cross-flow heat exchanger having a primary coolant circuit comprising an incoming cool leg 401 and outgoing warm leg 402. The condenser 400 further comprises a wet air intake 403 and a dry air exhaust 404. Both the wet air intake 403 and the dry air exhaust 404 are operably coupled to be in fluid communication with the hermetically sealed cavity 215 (see FIG. 2 for positioning of wet air intake 403 and dry air exhaust 404). As such, during operation, the condenser 400 will draw wet air (i.e., air containing high levels of tritiated water vapor) into the condenser 400 and into contact with the primary coolant circuit. Upon contacting the tubes of the primary coolant circuit, the tritiated water vapor will condense and gather within the condenser 400 as tritiated water in liquid form. This liquid form of tritiated water will then be directed to either a waste management sub-system or back into the spenbt nuclear fuel pool 100 via a drain line 406. After the wetted air is cooled (and the tritiated water vapor is condensed out therefrom), the resulting dried air is reintroduced back into the hermetically sealed cavity 215 via the dry air exhaust line 404.

In the exemplified embodiment, the wet air intake 403 and the dry air exhaust 404 extend through the floor surface 111 of the internal atmosphere of the containment structure so as to avoid interfering with the hermetic seal formed about the perimeter of the spent nuclear fuel pool 100 by the cooperation of the tent structure 200 and the gasket 230. However, in other embodiments, the tent structure 200 can be provided with connection ports to which the wet air intake 403 and the dry air exhaust 404 can be permanently coupled detachably coupled. Furthermore, in certain other embodiments, the wet air intake 403 and the dry air exhaust 404 may be operably coupled to the hermetically sealed cavity 315 formed between the tarp assembly 300 and the exposed surface 101 of the body of tritiated water 102 (discussed in greater detail below). Operable coupling to the hermetically sealed cavity 315 can be instead of or in addition to the coupling to the hermetically sealed cavity 215.

Referring now to FIGS. 2, 3 and 7 concurrently, the tarp assembly 300 will be described in grater detail. As mentioned above, the tarp assembly 300 can be used instead of or in addition to the tent structure 200. Similar to the tent structure 200, the tarp assembly 300 is movable between between an open state (FIG. 3) in which the tarp assembly 300 does not obstruct access to the exposed surface 101 of the body of tritiated water 102 and a closed state (FIGS. 2 and 7) in which the tarp assembly 300 hermetically seals the exposed surface 101 of the body of tritiated water 102.

The tarp assembly 300 generally comprises a vapor impermeable membrane 320, two seal roller assemblies 340A,B, two channel guides 350, a feed roller assembly 360 and an anchor assembly 370. The vapor impermeable membrane 320 of the tarp assembly 300 is similar in construction and materials as described above with respect to the vapor impermeable membrane 320 of the tent structure 200.

The vapor impermeable membrane 320 of the tarp assembly 300 is preferably a thin flexible sheet of material that is impervious to water vapor. Of course, in alternate embodiments, the vapor impermeable membrane 320 could be rigid. In such an embodiment, the vapor impermeable membrane 320 could take the form of one or more platen structures that are retractable. However, flexibility is preferred to facilitate wrapping about the feed roller assembly 360. The vapor impermeable membrane 320 can be a single-layer construct or a multi-layer laminate. If the vapor impermeable membrane 320 is a single-layer construct, the single layer is made of a rubber, a thermoplastic elastomer, a polymer, a metal or other material that is impervious to water vapor. In one embodiment wherein the vapor impermeable membrane 320 is a multi-layered laminate, the vapor impermeable membrane 320 can comprise at least one vapor impermeable layer 321, at least one radiation shielding layer 322, and at least one thermal insulating layer 323 (see FIGS. 4 and 5). The vapor impermeable layer 321, in one embodiment, can be constructed of a rubber, polymer, metal or other material that is impervious to water vapor. The radiation shielding layer 322 can be constructed of materials that are known in the art to absorb/shield neutron radiation and/or gamma radiation. The thermal insulating layer 323 can be formed of, without limitation, blankets of alumina-silica fire clay (Kaowool Blanket), oxides of alumina and silica (Kaowool S Blanket), alumina-silica-zirconia fiber (Cerablanket), and alumina-silica-chromia (Cerachrome Blanket). onstructed out of material such as a Kaewool blanket. In the specific embodiment exemplified, the upper-most and lower-most layers of the vapor impermeable membrane 320 are vapor impermeable layers 321 wherein the radiation shielding layer 322 and the thermal insulating layer 323 are sandwiched therebetween.

When the tarp assembly 300 is in the closed state, the vapor impermeable membrane 320 seals the exposed surface 101 of the body of tritiated water 102, thereby forming a hermetically sealed cavity 315 between an undersurface of the vapor impermeable membrane 320 and the exposed surface 101 of the body of tritiated water 102. The hermetic nature of the sealed cavity 315 can be formed by forming a hermetic seal along a perimeter region of the vapor impermeable membrane 320. In the exemplified embodiment, this is accomplished by creating hermetic seals between the lateral edges of the vapor impermeable membrane 320 and the guide channels 350A, B (see FIG. 4), a hermetic seal between a distal portion of the vapor impermeable membrane 320 and the seal roller assembly 340A (see FIG. 5), and a hermetic seal between a proximal portion of the vapor impermeable membrane 320 and the seal roller assembly 340B (identical to that shown in FIG. 5). Of course, the invention is not so limited and the vapor impermeable membrane 320 can form a hermetic seal about the perimeter of the spent nuclear fuel in a variety of manners, including the use of a heavy mat, bar clamps, suction, a tight fit, wrapping, or combinations thereof. Still other methods of ensuring sufficient contact between the vapor impermeable membrane 320 and the floor surface 111 can be used, such as, for example, taping or hook-and-loop type fasteners.

The feed roller assembly 360 and the seal roller assembly 340B are positioned on a first side 104 of the spent nuclear fuel pool 100 while the anchor assembly 370 and seal roller assembly 340A are positioned on a second side 103 of the spent nuclear fuel pool 100 that is opposite the first side 104. Similarly, the guide channels 350A, 350B are located on opposite lateral sides 106, 105 of the spent nuclear fuel pool 100 respectively. All of these assemblies are mounted to the floor surface 111. In alternate embodiments, the aforementioned components and assemblies 340A-B, 350A-B, 360, 370 can be positioned in alternate locations relative to one another and/or the spent nuclear fuel pool 100. For example, in one embodiment, the guide channels 350A, 350B (and other structures) can be mounted on the vertical walls of the spent nuclear fuel pool 100 above the water level.

As discussed below, the guide channels 350A, 350B function to form a hermetic seal with the vapor impermeable membrane 320 along the lateral edges of the vapor impermeable membrane 320. However, the guide channels 350A-B also function to mechanically secure the lateral edges of the vapor impermeable membrane 320 within the guide channels 350A-B so as to prevent the vapor impermeable membrane 320 from sagging into contact with the exposed surface 101 of the body of tritiated water 102 (see FIG. 4).

The feed roller assembly generally comprises a pair of mounting brackets 363, a roller 361, and a drive motor 363. The roller 361 is rotatably mounted between the mounting brackets 363 so that the roller 361 can be rotated both clockwise and counterclockwise. The drive motor 362 is operably coupled to the roller 361 so that the roller can be rotated as desired automatically. A proximal end portion of the vapor impermeable membrane 320 is coupled to the roller 361 so that rotation of the roller 361 in one direction causes the vapor impermeable membrane 320 to wrap around the roller and become retracted from the closed state to the open state. Rotation of the roller 361 in the opposite direction allows the vapor impermeable membrane 320 to become unwrapped from the roller 361 and become protracted from the open state to the closed state.

The anchor assembly 370 comprises a first anchor 371 and a second anchor 372. The first and second anchors 371, 371 comprises a retractable cord, in the form of cables 373, that are secured to the distal edge of the vapor impermeable membrane 320. The first and second anchors are spring-loaded so as to keep tension on the vapor impermeable membrane 320 at all times, thereby keeping the vapor impermeable membrane 320b taut during movement between the closed-state to the open state and vice-versa. The spring force of the anchors 371, 372 is selected so as to be overcome by the activation of the motor 362 to retract the vapor impermeable membrane 320 without tearing the vapor impermeable membrane 320. When the vapor impermeable membrane 320 is in the open state, the motor only need to be put into neutral and the spring force of the anchors 371, 372 can automatically pull the vapor impermeable membrane 320 into the closed-state. Of course, the location of the drive motor can be switched along with the biasing spring force in alternate embodiments. For example, in one particular embodiment, the vapor impermeable membrane 320 will always be biased into the open state, thus requiring activation of the drive motor and subsequent locking to maintain the vapor impermeable membrane 320 in the closed state. Such an arrangement can ensure venting of the spent nuclear fuel pool 100 in the event of power loss. In such an embodiment, the roller 360 of the feed roller assembly 360 may be spring-loaded while the drive motors are located within the anchor assembly 370.

The anchors 371, 372 are positioned so that when the vapor impermeable membrane 320 is in the open state, the cables 373 do not extend over the exposes surface 101 of the body of tritiated water 102. As a result, the cables 373 do not present any potential of interfering with the loading and unloading of spent nuclear fuel from the spent nuclear fuel pool 100. Thought of another way, the retractable cables 373 are located outboard of a perimeter (formed by sides 103-106) of the spent nuclear fuel pool 100 when the vapor impermeable membrane 320 is in the open-state. In the exemplified embodiment, the cables 373 extend into the channel guides 350A-B when the vapor impermeable membrane 320 is in the open-state, thereby further preventing any danger of accident or obstruction.

Figure 4:
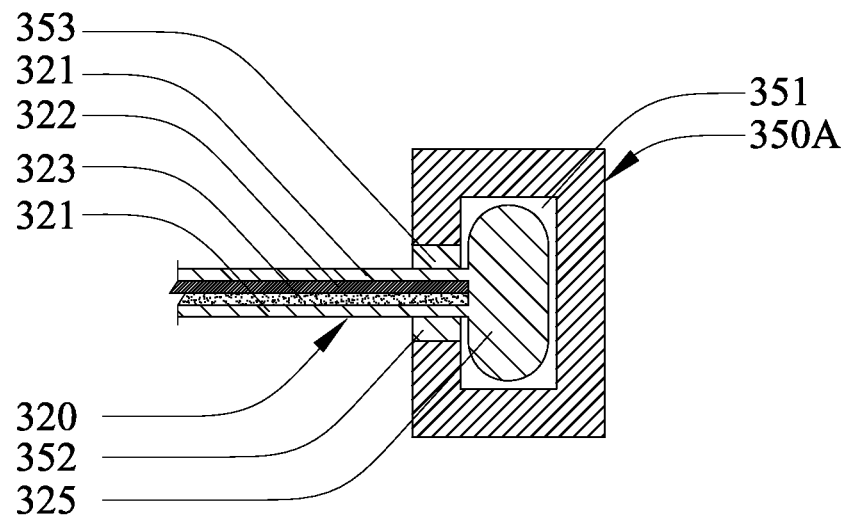
FIG. 4 is cross-sectional view of guide channel of the tarp assembly taken along view IV-IV of FIG. 2.

Referring now to FIG. 2-4 concurrently, the guide channels 350A-B are mounted to the floor surface 111 but can be mounted elsewhere as discussed above. Each of the guide channels 350A-B is an elongated member and is of the C-channel type. Of course, other cross-sections can be used to form the guide channels 350A-B as desired. Each of the guide channels 350A-B comprises an open slot 351 in which a flanged lateral edge 325 of the vapor impermeable membrane 320 nests. The flanged later edges 325 of the vapor impermeable membrane 320 can slide longitudinally within the open slots 351 of the guide channels 350A-B, thereby affording the vapor impermeable membrane 320 to be moved between the open state and the closed state as desired. However, due to their flanged nature, the lateral edges 325 of the vapor impermeable membrane 320 can not be transversely pulled from the slots 351 of the guide channels 350A-B due to the interference fit. In alternate embodiments, the lateral edges 325 of the vapor impermeable membrane 320 may be provided with rollers to facilitate ease of movement within the guide channels 350A-B instead of or in addition to the flanged profile.

Furthermore, in certain instances, it may be desirable to add linear gaskets 352, 353 to the longitudinal edges of the longitudinal openings of the slots 351. Such linear gaskets 352, 353 serve not only to increase the integrity of the hermetic seals but can also protect the vapor impermeable membrane 320 from sharp edges. Moreover, the materials of the linear gaskets 352, 353 can be selected to provide reduced frictional resistance of sliding between the vapor impermeable membrane 320 and the guide channels 350A-B.

Figure 5:
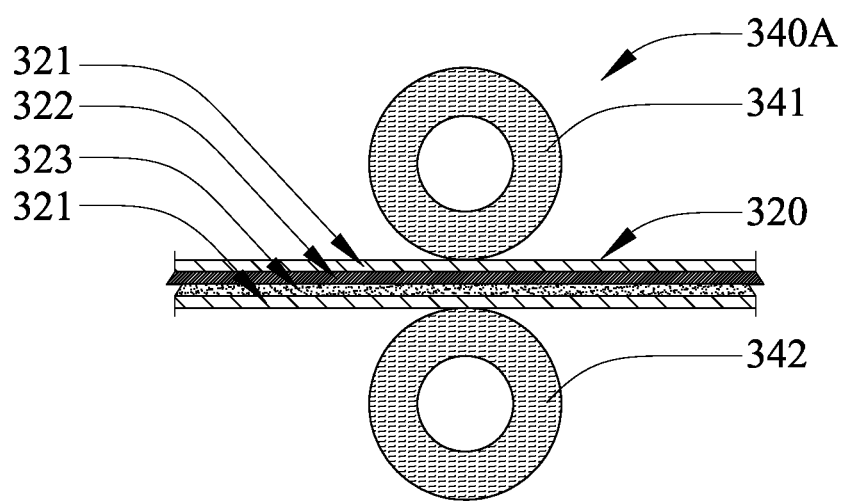
FIG. 5 is a cross-sectional view of the seal roller assembly of the tarp assembly taken along view V-V of FIG. 2.

Referring now to FIGS. 2-3 and 5, each of the seal roller assemblies 340A-B comprises a pair of mounting brackets 343 and pair of compressible rollers 341, 342. The compressible rollers 341, 342 are rotatably mounted for free rotation to the mounting brackets 343. The tolerance between the compressible rollers 341, 342 is selected so that the vapor impermeable membrane 320 can fit between and be freely pulled through the compressible rollers 341, 342. Each pair of the compressible rollers 341, 342 form a hermetic seal with the vapor impermeable membrane 320 along their length. The seal roller assemblies 340A-B are located adjacent the ends of the guide channels 350A-B to minimize any gaps/tolerances through which air can flow.

While the seal roller assemblies 340A-B are exemplified with two rollers 341, 342, in other embodiments, other structures may be used to create the desired hermetic seals along the proximal and distal perimeter portions of the vapor impermeable membrane 320. Such structures can be used instead of or in addition to one or more of the rollers 341, 342. For examples, compression bars and gaskets may be used along with other known techniques for creating a hermetic seal.

All gaskets and rollers described herein can be constructed of a vapor impermeable and compressible material, such as a thermoplastic elastomer, rubber or polymers.

In one embodiment, the vapor impermeable membrane 320 is made with a color that contrasts with the pool color so that if the cover is introduced into the pool, in whole or in part, the vapor impermeable membrane 320 can be easily identified and retrieved. This color contrast will avoid and prevent foreign materials from being lost in critical plant systems.

Figure 8:
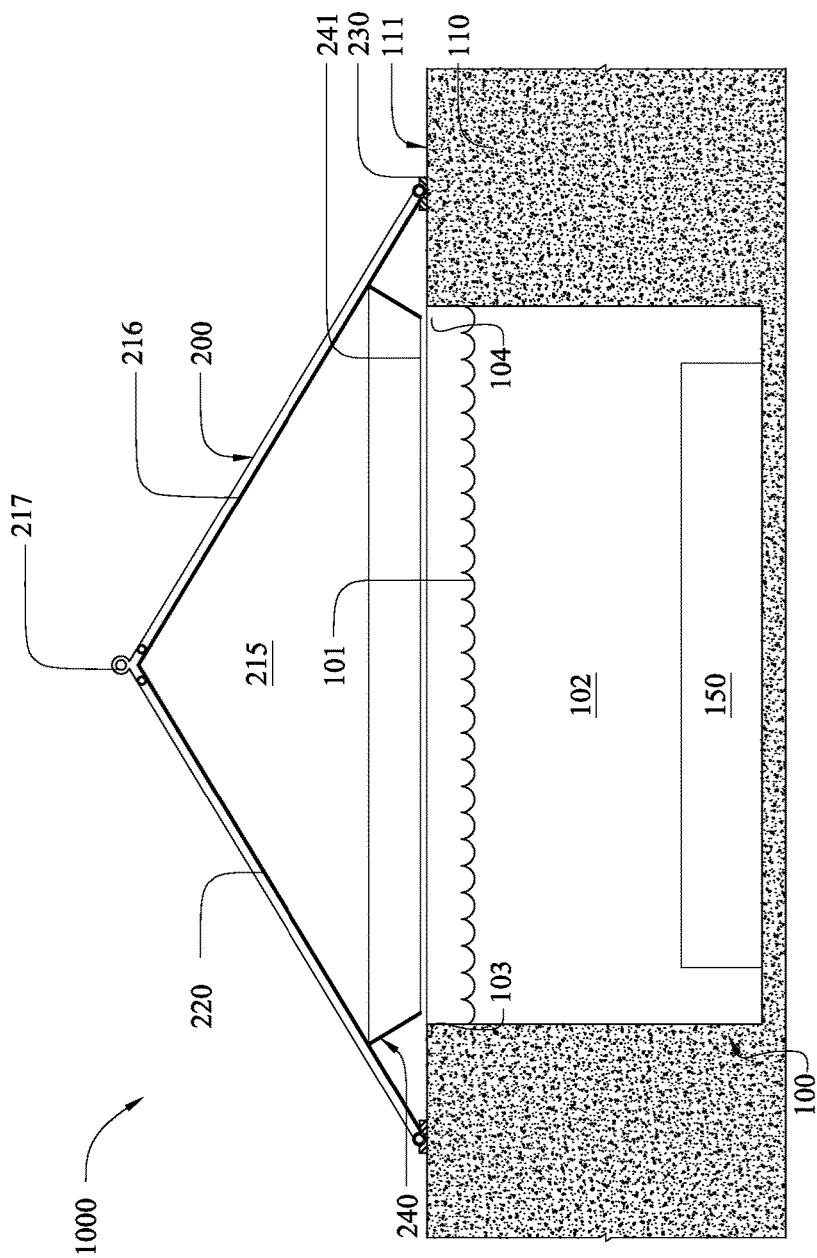
FIG. 8 is a side-view schematic of a system for reducing tritium migration in accordance with an alternate embodiment of the present invention, wherein the tent structure comprises an internal funnel and the tarp assembly is omitted.

Referring now to FIG. 8, an alternate embodiment of the TMR system 1000 is exemplified. The TMR system 1000 of FIG. 8 is similar to that of the TMR system of FIG. 1 with the exception that the tarp assembly 300 is omitted and an internal funnel 240 has been added to the tent structure 200. The internal funnel 240 is also made of a material that is impervious to water vapor and liquid, such as those materials discussed above for the membranes 220, 320. The internal funnel 240 directs tritiated water vapor that condenses on the inner surface 216 of the vapor impermeable membrane 220 either into a waste management subsystem or back into the body of tritiated water 102 of the spent nuclear fuel pool 100. In the exemplified embodiment, the internal funnel 240 directs the condensed triatiated water vapor back into the body of tritiated water 102 of the spent nuclear fuel pool 100. Thus, the internal funnel 240 comprises a drip edge 241 that is located above the exposed surface 101 of the body of tritiated water 102 of the spent nuclear fuel pool 100. As a result, the tritiated water vapor that condenses on the inner surface 216 of the vapor impermeable membrane 220 drips back into the body of tritiated water 102 of the spent nuclear fuel pool 100.

The internal funnel 240 is sloped in the opposite direction of the vapor impermeable membrane 220 of the tent structure 200. In alternate embodiments, the internal funnel 240 can be adapted to collect the condensate that forms on the vapor impermeable membrane 220. The internal funnel 240 is preferably sized and configured to permit air communication between the exposed surface 101 of the body of tritiated water 102 and the apex 214 of the tent structure 200, while still covering a large subsurface area under the vapor impermeable membrane 220. The internal funnel 240 is conically formed downward. In alternate embodiments, a drainage tube can be supplied at the bottom of the funnel 240. The drainage tube can be connected to a drain at the bottom of the conically formed funnel 240 and can transport the condensation caught in the funnel 240 either back to the spent fuel pool or to a separate waste system.

While not illustrated, either of the TMR systems 1000 of FIG. 1 or 8 can further comprise industrial dehumidifiers positioned within the containment structure adjacent the spent nuclear fuel pool 100 to reduce humidity. The dehumidifiers can include an enclosed collection basin to prevent re-evaporation of the condensate. In a preferable embodiment, the dehumidifiers are hard piped to an appropriate waste collection tank to transfer any water caught in the dehumidifiers directly to the waste collection tank. The dehumidifiers can be especially important during periods of operation where the pool needs to be uncovered due to work in the pool. Often, at the start of nuclear power plant refueling operations, the spent fuel pool has increased heat loading and therefore elevated temperature and humidity in the pool room. The increase in pool temperature drives greater evaporative losses and hence greater tritiated water distribution. The dehumidifiers seek to mitigate the extent of the evaporative losses that may occur, if not eliminate them altogether, during plant refueling operations.

In addition, the TMR system 1000 further comprises a plurality of humidity traps 500. The humidity traps 500 induce sub-cooling of any evaporated water onto controlled surfaces. In other words, the traps 500 are controlled surfaces within the containment structure that are specifically designed so that tritiated water evaporation is attracted to them. Specifically, sacrificial collection plates 501 comprising metal fins, tubes or plates are embedded in a desiccate adsorption material 502. The humidity traps 500 are positioned throughout the containment structure. A dessicant is a hygroscopic, or water attracting substance that induces or sustains a state of extreme dryness. These sacrificial collection plates 501 further attract and capture any water vapor that escapes the tent structure 200 and/or the tarp assembly 300.

Moisture which sub-cools on the metal sacrificial collection plates 501 will drip onto the desiccate material 502 thereby trapping the moisture and associated tritiated water by adsorption and capillary condensation. The uncoated metal collectors 501 are more attractive targets to the tritiated water than coated materials in the room. Thus, standalone desiccate moisture traps 500 should be introduced at strategic locations within and around the pool enclosure.

The invention is not limited to having all of the above discussed attributes combined or in use at the same time. Rather, any one of the membrane cover, tent enclosure with catch basin, dehumidifiers, sacrificial collection plates, sealed entrance points, coated room surfaces or temperature monitoring may be used exclusive of the others. Furthermore, any combination of the aspects of this invention may be used in conjunction to increase the likelihood of preventing and/or controlling tritium migration from nuclear fuel storage pools. However, creating a system, method and/or apparatus that incorporates all of the inventive features described herein will provide the greatest likelihood of preventing and/or controlling tritium migration from nuclear fuel storage pools.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention.

What is claimed is:

1. A system for reducing tritium migration comprising:
a spent nuclear fuel pool comprising a body of tritiated water having an exposed surface; and
a cover comprising:
   a sheet having an inner surface opposite an outer surface and a side surface extending between the inner and outer surface, the inner surface facing the exposed surface of the body of tritiated water, the sheet-further comprising a vapor impermeable membrane that includes:
      a first vapor impermeable layer;
      a radiation shielding layer; and
      a thermal insulating layer; and
   a frame comprising a base, whereby the first vapor impermeable membrane wraps around at least a portion of the base;
   wherein the first vapor impermeable membrane layer extends continuously from the inner surface of the sheet across the side surface of the sheet to outer surface of the sheet.

2. The system of claim 1, wherein the sheet a continuous sheet.

3. The system of claim 1, wherein the vapor impermeable membrane further includes a second vapor impermeable membrane, wherein the radiation shield layer and the thermal insulating layer are sandwiched between the first and second vapor impermeable layers.

4. A system for reducing tritium migration comprising:
a spent nuclear fuel pool comprising a body of tritiated water having an exposed surface;
a cover comprising:
   a sheet having an inner surface opposite an outer surface and a side surface extending between the inner and outer surface, the inner surface facing the exposed surface of the body of tritiated water, the sheet-further comprising a vapor impermeable membrane that includes a first vapor impermeable layer;
   a radiation shielding layer; and
   a thermal insulating layer;
   wherein the first vapor impermeable membrane layer extends continuously from the inner surface of the sheet across the side surface of the sheet to outer surface of the sheet;
   a frame comprising a base, whereby the first vapor impermeable membrane wraps around at least a portion of the base; and
   a gasket that forms a closed perimeter about the spent nuclear fuel pool, and the first vapor impermeable layer is located between the gasket and the base.

5. A system for reducing tritium migration comprising:
a spent nuclear fuel pool comprising a body of tritiated water having an exposed surface;
a cover comprising:
   a sheet having an inner surface opposite an outer surface and a side surface extending between the inner and outer surface, the inner surface facing the exposed surface of the body of tritiated water, the sheet-further comprising a vapor impermeable membrane that includes
      a first vapor impermeable layer;
      a radiation shielding layer; and
      a thermal insulating layer;
   wherein the first vapor impermeable membrane layer extends continuously from the inner surface of the sheet across the side surface of the sheet to outer surface of the sheet;
   a frame comprising a base, whereby the first vapor impermeable membrane wraps around at least a portion of the base;
   wherein the vapor impermeable membrane further includes a second vapor impermeable layer, wherein the radiation shield layer and the thermal insulating layer are sandwiched between the first and second vapor impermeable layers, and the second vapor impermeable membrane contacts at least a portion of the base of the frame.

* * * * *